United States Patent [19]

Stringer et al.

[11] 4,104,406

[45] Aug. 1, 1978

[54] COATED EXPANDED ANIMAL FOOD

[75] Inventors: William G. Stringer; Robert E. Schara, both of Battle Creek; Charles T. Stocker, Augusta, all of Mich.

[73] Assignee: General Foods Corporation, White Plains, N.Y.

[21] Appl. No.: 532,341

[22] Filed: Dec. 13, 1974

Related U.S. Application Data

[63] Continuation of Ser. No. 337,338, Mar. 2, 1973, abandoned.

[51] Int. Cl.$^2$ .............................................. A23J 3/00
[52] U.S. Cl. ......................................... 426/99; 426/96; 426/103; 426/293; 426/805; 426/560; 426/623
[58] Field of Search ............. 426/92, 94, 96, 98, 426/99, 103, 291, 293, 295, 302, 303, 307, 805, 559, 560, 623, 625

[56] References Cited

U.S. PATENT DOCUMENTS

| | | | |
|---|---|---|---|
| 3,094,947 | 6/1963 | Green et al. | 426/290 |
| 3,119,691 | 1/1964 | Ludington | 99/2 |
| 3,615,647 | 10/1971 | Kassens | 99/2 |
| 3,814,822 | 6/1974 | Henthorn | 426/293 |
| 3,830,941 | 8/1974 | Luft et al. | 426/94 |
| 3,840,685 | 10/1974 | Lyall et al. | 426/99 |

*Primary Examiner*—Norman Yudkoff
*Attorney, Agent, or Firm*—T. J. Carvis; D. J. Donovan; B. P. Struzzi

[57] ABSTRACT

A dry particulate porous expanded animal food is disclosed comprised of chunks or kibs of a mixture of farinaceous and proteinaceous ingredients. The kibs are then coated with a fat/dextrin material emulsion. The product is characterized by its improved ability to resist rapid extensive hydration when liquid is added and hence remain crispy in liquid for substantial periods of time. The product is also of improved palatability and appeal to pets.

2 Claims, No Drawings

COATED EXPANDED ANIMAL FOOD

This is a continuation of application Ser. No. 337,338, filed Mar. 2, 1973.

BACKGROUND OF THE INVENTION

There are several chunk style dry animal food products on the market today which are particularly appealing to the consumer due to their shelf stability and convenience. These products are specifically formulated using proteinaceous and/or farinaceous source ingredients, and are characterized by a porous structure and crunchy texture. These products may be served as is or may be rehydrated with water prior to consumption by the dog or cat. The palatability of these products is further enhanced by a coating of fat on the surface of the chunk or kib, over which coating may be applied a powdered gravy forming material based on gums, starches, coloring and flavoring material. Upon hydration, the gravy forming material serves to thicken and color the water thereby simulating a gravy or meat sauce.

Such products may be manufactured by preparing a mixture of farinaceous and/or proteinaceous ingredients with optional vitamin and mineral supplements, said mixture having a moisture content within the range of about 20 to 40% by weight. This mixture is processed by heating it above about 212° F and subjecting it to superatmospheric pressure and masceration such as in an extruder, and extruding it through an extrusion die into the atmosphere. As the material issues from the die it expands into a porous, expanded product due to the pressure drop across the die and the flashing off of the water as steam. The extrudate is then cut into bite size kibs having a mean diameter within the range of about ¼ to ¾ inch, dried to a moisture content of less than about 10% by weight, coated with fat and optionally a powdered gravy forming ingredient, and packaged. Examples of such products and the methods for preparing them may be found in U.S. Pat. Nos. 3,119,691 and 3,447,929.

Kennel studies show that the aforementioned products have greater appeal to the pet when served mixed with water. However, due to the porous nature of the product, the kibs rapidly absorb water such that in a period of five minutes or so the kibs have lost much of their crunchy texture, particularly attractive to dogs, and become soggy or mushy. Thus, a certain amount of waste and inconvenience to the consumer may be encountered unless the hydrated kibs are consumed by the pet quickly after serving.

Accordingly, it is an object of this invention to prepare a hydratable animal food product which retains its crunchy and crispy texture for longer periods of time when served with water.

A further object of this invention is to prepare a hydratable animal food of improved palatability which exhibits an improved resistance to quick wetting and also the tendency to become mushy or soggy after periods of exposure to water.

SUMMARY OF THE INVENTION

It has been discovered that a dry, expanded, porous animal food product of improved resistance to becoming mushy or soggy in liquid can be produced by forming animal food kibs of a mixture of farinaceous and proteinaceous ingredients and applying to the exterior of the kibs a coating comprised of an emulsified mixture of a dextrin material and fat. A gravy forming and thickening material may then optionally be coated on the kibs if desired.

The animal food of this invention displays substantially improved resistance to rapid hydration when added to liquid and retains its crunchy character after long periods of time.

DETAILED DESCRIPTION OF THE INVENTION

The dry, particulate, porous, extended animal food products of this invention comprise a mixture of farinaceous and proteinaceous materials having a coating of an emulsified mixture of a dextrin material and fat.

The farinaceous ingredients according to this invention may be wheat, corn, barley, oats, their derivatives such as corn meal, hominy, and other like ingredients. Typically, the total amount of farinaceous ingredients based on the weight of the farinaceous/proteinaceous mixture is between 35 to 70% by weight.

The proteinaceous ingredients used in the mixture may be of vegetable, animal or fish origin, and typically soy bean meal, soy grits, meat meal or fish scrap. Typically the proteinaceous ingredients comprise from about 20 to 50% by weight of the total mixture.

The balance of the mixture may comprise salts, flavorings, colorings, vitamin supplements and other like ingredients to form a nutritionally balanced animal food product.

In preparing the animal food kibs of this invention, the above-recited materials are mixed together and then mechanically worked under elevated temperatures and pressures, generally in an extruder apparatus, to form an expanded porous product. Typically the temperatures in the extruding zone are above 212° F. Steam and/or water is generally injected to control moistures and temperatures. The residence time of the mixture in the extruder is relatively short and generally in the order of 15 seconds to 120 seconds. The mixture exits the extruder into the atmosphere through an extruder die orifice. As the material issues from the die it expands into a porous expanded product due to the pressure drop across the die and the flashing off of the water as steam. The extrudate, typically in rope form having a moisture content of about 20 to 35% by weight is then cut into the desired kib size and dried to a stable moisture content generally about 10% and lower.

According to this invention, the animal food kibs are then coated with an emulsified mixture of a dextrin material and fat. The dextrin material must of course be an edible one and one that does not adversely affect or influence the taste or odor of the final animal food product. Materials such as corn syrup, corn syrup solids, dextrins and other like starch hydrolysis products and mixtures thereof have all been found satisfactory for use in this invention.

Fat according to this invention may be any fat and preferably one liquifiable at reasonable temperatures, say, 110° F to 140° F. The preferred fat is tallow.

Generally it is desired that the starch and fat be mixed and applied to the kibs such that the kibs contain anywhere from about 1 to 8% of each component of the mixture. The relative proportions of each component in the mixture are not critical per se though it is preferred to use a 1:1 ratio by weight.

The dextrin material and liquified fat are mixed together with an emulsifier to form an emulsified mixture. Water also may be added to the mixture to adjust the viscosity thereof. The emulsifier may be any of the known edible emulsifiers such as sodium stearate, potassium laurate, sodium lauryl sulfate, calcium stearoyl-2-lactylate, sodium sulfosuccinate, magnesium oleate, aluminum stearate, polyoxyethylene fatty alcohol ethers, polyglycol fatty acid esters, polyoxyethylene modified fatty acid esters, polyoxethylenepolyol fatty acid esters, polyoxypropylene fatty alcohol esters, polyol fatty acid monoesters, lecithin, polyhydric alcohol fatty acid di-, tri-, etc. esters, polyethylene glycol and fatty acid esters thereof, methyl cellulose, hydroxypropylmethyl ether of cellulose, and the like, or mixtures of these.

The emulsion may be prepared simply by mixing the components with the emulsifier in any suitable mixing device such as a high speed blender. The emulsified mixture is applied to the animal food kibs either in the form of a fine spray, tumbling the kibs in the emulsified mixture, or any like method. The mixture generally dries after contact with the kibs, especially when the emulsion is applied in small amounts. Where larger amounts are employed, say, over 4%, further drying may be necessary to remove any remaining moisture.

The kibs may then further have a gravy-forming and thickening agent coated thereon such that a simulated gravy or sauce results when water is added to the kibs.

The dry animal food products of this invention are found to retain their crispy, crunchy texture in water for substantially longer periods than uncoated kibs or kibs with a fat coating alone. The improved kibs of this invention are more resistant to become soggy or mushy due to rapid, extensive hydration and accordingly are more appealing and palatable to pets.

The invention is further illustrated by the following examples.

EXAMPLE I

A batch of dry, expanded animal food kibs were prepared from the following ingredients:

|  | % |
| --- | --- |
| Hominy feed | 37 |
| Wheat grey shorts | 13 |
| Corn germ meal | 9.6 |
| Soybean Oil Meal | 16 |
| 52% meat meal | 17 |
| Wheat germ meal | 3 |
| Dried milk | 0.9 |
| Beet pulp | 1.7 |
| Fish scrap | .7 |
| Brewer's yeast | 0.5 |
| Salt | 0.5 |
| Vitamins and minerals | 0.1 |

The ingredients were mixed together and water and steam passed to the mixture to raise the water content to about 27%. The mixture was then placed in a Wenger extruder operating at temperatures averaging about 250° F. The pressure just before the die orifice was about 300 psig and the mixture was issued through the circular extruder die into atmosphere in the form of an expanded rope at about 180° F. The rope was cut into kibs of about ¾ inch length and dried at 250° F for 10 minutes to a moisture of about 7-8%.

EXAMPLE II

The kibs from Example I were separated into groups and treated as follows:
Sample 1 — untreated kibs Sample 2 — kibs coated with 4% tallow by spraying kibs with liquified tallow at about 150° F.

Sample 3 — kibs coated with an emulsified mixture of 2.0 lbs corn syrup, 2.4 lbs liquified tallow, emulsified by adding 9 grams of VERV #5 (calcium stearoyl-2-lactylate, manufactured by Patco Products) to the mixture and blending in a high speed blender. The emulsified mixture was applied to 45.6 pounds of kibs in the form of a fine spray mist.

All the samples were then dried at 250° F for 10 minutes.

In order to compare the resistance of the samples to rapid, extensive hydration, the following procedure was employed. 200 grams of each sample were added to 400 ml of water at 110° F and mixed for 15 seconds. After 3 minutes, the samples were poured onto 20 mesh screens (U.S.) and the free liquid was drained and measured. The amount of free liquid was subtracted from the 400 ml of original water, divided by the weight of the sample, and multiplied by 100 to get a percent rehydration figure. The higher the figure, the less free liquid collected and, therefore, the more water absorbed by the sample.

The results were as follows:
Sample 1 — 117.5%
Sample 2 — 110.0%
Sample 3 — 70.0%

Further, the animal food prepared according to Sample 3 was found to still be crisp and crunchy even after 10 minutes in water while the animal foods of Samples 1 and 2 were mushy and soggy after an equivalent time in identical amounts of water.

EXAMPLE III

Kibs from Example I (45.6 lbs) were coated with an emulsion prepared by mixing 9 grams of Verv #5 with 3.0 lbs. water and 1.0 lbs. of Crystal Gum, a tapioca dextrin manufactured by National Starch and 2.4 lbs. tallow. Kibs with only 4% tallow coated thereon exhibited a percent rehydration (described in Example II) of 117.5% while the kibs coated with the emulsion of this example had a percent rehydration of 67.5%. The emulsion coated kibs of this Example were found to be crisp and crunchy and not totally rehydrated even after 15 minutes in water while the kibs coated with fat only had fully rehydrated after 9 minutes.

As can be seen from the above examples, then, the animal food product of this invention displays a substantially improved resistance to rapid extensive hydration and to losing its crispiness in water. The net result is a more appealing and palatable product.

The examples presented are to be understood as illustrations of specific embodiments of this invention and are not intended to be limiting in any way. Obvious variations and alterations of both the product and process of this invention are believed ascertainable without departing from the scope and spirit of the invention and the appended claims.

We claim:
1. A dry, porous particulate nutritionally balanced animal food product comprised of an expanded mixture of between 35 to 70% by weight farinaceous and from about 20 to about 50% by weight proteinaceous ingredients, said animal food product having coated on the exterior thereof an emulsified mixture comprised of an emulsifier, fat and a dextrin material selected from the group consisting of corn syrup, corn syrup solids, dextrins and mixtures thereof, said product containing on the exterior thereof from about 1 to 8% by weight fat and 1 to 8% by weight dextrin material, said animal food product characterized by its improved resistance to rapid extensive hydration when mixed with liquid and improved palatability.

2. In a method of preparing an expanded, porous, dry particulate nutritionally balanced animal food product wherein a mixture of between 35 to 70% by weight farinaceous and from about 20 to 50% by weight proteinaceous ingredients is mechanically worked at elevated pressures and temperatures, extruded through a die orifice into atmosphere to cause said mixture to expand, cut into a desired shape and size, and dried, the improvement comprising applying an exterior coating of an emulsified mixture comprised of emulsifier, water, fat and a dextrin material selected from the group consisting of corn syrup, corn syrup solids, dextrins, and mixtures thereof to said animal food product such that said product contains from about 1 to 8% by weight fat and from 1 to about 8% by weight dextrin material on the surface thereof.

* * * * *